US012066666B2

(12) United States Patent
Hirota et al.

(10) Patent No.: US 12,066,666 B2
(45) Date of Patent: Aug. 20, 2024

(54) OPTICAL FIBER LATERAL INPUT/OUTPUT DEVICE

(71) Applicant: Nippon Telegraph and Telephone Corporation, Tokyo (JP)

(72) Inventors: Hidenobu Hirota, Tokyo (JP); Takui Uematsu, Tokyo (JP); Hiroyuki Iida, Tokyo (JP); Naotsugu Ambe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 474 days.

(21) Appl. No.: 17/420,954

(22) PCT Filed: Jan. 6, 2020

(86) PCT No.: PCT/JP2020/000009
§ 371 (c)(1),
(2) Date: Feb. 14, 2022

(87) PCT Pub. No.: WO2020/149157
PCT Pub. Date: Jul. 23, 2020

(65) Prior Publication Data
US 2022/0171137 A1 Jun. 2, 2022

(30) Foreign Application Priority Data
Jan. 18, 2019 (JP) ................. 2019-006490

(51) Int. Cl.
*G02B 6/38* (2006.01)
*F21V 8/00* (2006.01)
(52) U.S. Cl.
CPC ......... *G02B 6/3802* (2013.01); *G02B 6/0006* (2013.01); *G02B 6/3898* (2013.01)
(58) Field of Classification Search
CPC ...... G02B 6/3802; G02B 6/38; G02B 6/3898; G02B 6/0006
See application file for complete search history.

(56) References Cited

U.S. PATENT DOCUMENTS 5,333,217 A * 7/1994 Kossat ................. G02B 6/2852
385/32
9,400,228 B2 * 7/2016 Niimi ................... G02B 6/2852
(Continued)

FOREIGN PATENT DOCUMENTS

JP H0221604 1/1990
JP 2016218348 12/2016
JP 2017161821 9/2017

OTHER PUBLICATIONS

Honda et al., "Basic Study on Light Path Switching System Using Local Optical Input/Output Technology," IEICE Technical Report, 112(261):43-46, 9 pages (With English Translation).
(Continued)

*Primary Examiner* — Tina M Wong
(74) *Attorney, Agent, or Firm* — Fish & Richardson P.C.

(57) ABSTRACT

An object of the present invention is to provide, in a local-light coupling technique for improving efficiency of work, an optical fiber local-light coupling apparatus configured to hardly affect communication between an OLT and an ONU while causing light to leak from a coated optical fiber in such an amount that makes it possible to confirm a communication state.
The optical fiber local-light coupling apparatus according to the present invention includes a first jig including a concave portion curved in a longitudinal direction with respect to a coated optical fiber, and a probe configured to receive leakage light leaking from the coated optical fiber being bent; a second jig including a convex portion curved in the longitudinal direction with respect to the coated optical fiber, the convex portion being configured to sandwich the coated optical fiber between the convex portion and the concave portion of the first jig; a pressing unit configured to apply pressing force in a direction in which the concave portion of the first jig and the convex portion of the second jig (Continued)

approach each other to form a bend in the coated optical fiber; and a reflective film configured to cover a surface of the concave portion of the first jig except for a leakage light passage portion through which, among the leakage light, reception leakage light to be received by the probe passes, and reflect and return the leakage light other than the reception leakage light to the coated optical fiber.

6 Claims, 18 Drawing Sheets

(56) References Cited

U.S. PATENT DOCUMENTS

| | | | |
|---|---|---|---|
| 2011/0217004 A1* | 9/2011 | Niimi | G02B 6/2852 |
| | | | 385/32 |
| 2016/0103261 A1* | 4/2016 | Bauco | G02B 6/0288 |
| | | | 362/552 |
| 2016/0216431 A1* | 7/2016 | Sakuragi | G02B 6/0006 |
| 2022/0066101 A1* | 3/2022 | Uematsu | G02B 6/3802 |
| 2022/0128765 A1* | 4/2022 | Uematsu | G02B 6/4219 |

OTHER PUBLICATIONS

Takeshi et al., "FTTH section communication monitor technology that realizes in-call confirmation in the switching work such as trouble transfer," NTT Technical Journal, May 2009, pp. 40-42, 7 pages (With English translation).

* cited by examiner

OPTICAL FIBER LATERAL INPUT/OUTPUT DEVICE

CROSS-REFERENCE TO RELATED APPLICATIONS

This application is a National Stage application under 35 U.S.C. § 371 of International Application No. PCT/JP2020/000009, having an International Filing Date of Jan. 6, 2020, which claims priority to Japanese Application Serial No. 2019-006490, filed on Jan. 18, 2019. The disclosure of the prior application is considered part of the disclosure of this application, and is incorporated in its entirety into this application.

TECHNICAL FIELD

The present disclosure relates to an optical fiber local-light coupling apparatus configured to bend a coated optical fiber and input/output light through a side of the coated optical fiber.

BACKGROUND ART

FIG. 1 is a diagram illustrating a form of facilities of an existing optical access network. A passive optical network (PON) system in which a plurality of optical network units (ONUs) are connected to a single optical line terminal (OLT) is introduced, and the OLT and each ONU are connected using an integrated distribution module (IDM), an optical cable, and a splitter. As communication light, for example, light with wavelengths of 1490 nm and 1550 nm is output from the OLT, and light with a wavelength of 1310 nm is output from the ONU, whereby the OLT and the ONU recognize each other and high-speed broadband services such as the Internet, an IP phone and the like are provided to the customer.

In addition to communication facilities including optical cables, social infrastructure facilities of roads, electricity, gas, waterworks, railroad companies, and the like are constructed outside. At the time of construction of social infrastructure facilities, in a case where an optical cable obstructs the construction, the optical cable has to be re-routed in advance. The optical cable is cut and reconnected to a new optical cable so as to be re-routed.

In a case where the optical fiber is incorrectly connected at the time of re-routing, services cannot be provided to customers. Therefore, it is necessary to confirm whether the optical fiber has been connected correctly. For this purpose, a monitoring tool capable of confirming a communication state (see, for example, Non Patent Literature (NPL) 1) is used.

An installation location of a conventional monitoring tool is illustrated in FIG. 1. The monitoring tool is connected to a test port provided in the IDM. An optical signal outputted from the ONU passes through the splitter and the optical cable, and then reaches the IDM. Thereafter, the optical signal is branched by a coupler of the IDM, and the branched optical signal reaches the monitoring tool. The monitoring tool is capable of analyzing an Ethernet (registered trademark) frame, which is an uplink signal of the ONU, and can display a communication state included in the Ethernet (registered trademark) through a personal computer.

FIG. 2(a) illustrates an external appearance of the monitoring tool, and FIG. 2(b) is an example of ONU information displayed on a personal computer. The monitoring tool displays a MAC address assigned to the ONU. A priority of 0 indicates the Internet, a priority of 4 indicates an IP telephone, and a priority of 5 indicates an NGN optical telephone, and it is possible to confirm the usage status of each service from information such as "standby" or "in communication" being displayed.

The MAC addresses are acquired before and after the connection construction, and the acquired MAC addresses are compared. When the MAC addresses match each other, it can be determined that the optical fiber is correctly connected. After confirming that the optical fiber is correctly connected, the connection construction is finished.

However, the monitoring tool is installed in a communications building remote from the connection construction site. Because of this, two workers need to be dispatched. One of them is in the communications building and confirms the fiber connection, while the other worker connects the fiber at the connection construction site. In addition, it may be burdensome for the two workers to perform their respective operations while communicating with each other. This makes the operations inefficient.

For example, in a case where the operations performed at two locations (at the connection construction site and inside the building) are performed at a single location, it is possible to improve the efficiency. FIG. 3 illustrates a method for improving the efficiency. This method makes use of a physical phenomenon in which communication light leaks from a bend of a coated optical fiber being bent. A closure is disposed beforehand in the optical access network, and the coated optical fiber is wired in the closure. Since the coated optical fiber is thin, it is easily bent. That is, in the method of FIG. 3, a local-light coupling technique (see, for example, NPL 2) is applied in which the coated optical fiber is temporarily bent and an optical signal flowing through the coated optical fiber is extracted as leakage light.

CITATION LIST

Non Patent Literature

NPL 1: Tsuyoshi Isomura, Satoshi Shimazu, Yukihiro Fujimoto, Hiroki Kataoka, "FTTH Section Communication Monitoring Technique to Achieve Communication State Confirmation During Line Switching Operation such as Network Reconfiguration", NTT Technical Journal, pp. 40-42, 2009

NPL 2: Nazuki Honda, Tomohiro Kawano, Hidenobu Hirota, Makoto Shimpo, Tetsuya Manabe, Yuji Azuma, "Cable transfer system Using Local Injection and Detection Technique", IEICE Optical Fiber Technology Study Group, IEICE Technical Report, vol. 112, no. 261, OFT2012-40, pp 43-46, October 2012.

SUMMARY OF THE INVENTION

Technical Problem

However, the local-light coupling technique has the following problems. Bending loss of a coated optical fiber is uniquely determined depending on bending conditions thereof, and the magnitude of the bending loss affects the communication between the OLT and ONU accordingly. For example, when the coated optical fiber is bent with a radius of 2 mm, the bending loss may be so increased as to stop the communication between the OLT and ONU. On the other hand, when the bending radius is increased in order to reduce the bending loss, the amount of leakage light may decrease and the MAC address may not be confirmed by the monitoring tool.

Accordingly, in order to solve the above-mentioned problems, an object of the present invention is to provide, in a local-light coupling technique for improving efficiency of work, an optical fiber local-light coupling apparatus configured to hardly affect communication between an OLT and an ONU while causing light to leak from a coated optical fiber in such an amount that makes it possible to confirm the communication state.

Means for Solving the Problem

In order to accomplish the above-mentioned object, an optical fiber local-light coupling apparatus according to the present invention receives a part of leakage light from a coated optical fiber for communication state confirmation and returns the other part of the leakage light to the coated optical fiber.

Specifically, an optical fiber local-light coupling apparatus according to the present invention includes: a first jig including a concave portion curved in a longitudinal direction with respect to a coated optical fiber, and a probe configured to receive leakage light leaking from the coated optical fiber being bent; a second jig including a convex portion curved in the longitudinal direction with respect to the coated optical fiber, the convex portion being configured to sandwich the coated optical fiber between the convex portion and the concave portion of the first jig; a pressing unit configured to apply pressing force in a direction in which the concave portion of the first jig and the convex portion of the second jig approach each other to form a bend in the coated optical fiber; and a reflective film configured to cover a surface of the concave portion of the first jig except for a leakage light passage portion through which, among the leakage light, reception leakage light to be received by the probe passes, and reflect and return the leakage light other than the reception leakage light to the coated optical fiber.

The light leaks from a plurality of locations of the bend in the coated optical fiber, and, among the light having leaked therefrom, one beam of the light can be received as the light for the communication state confirmation. Thus, the optical fiber local-light coupling apparatus reduces the bending loss by returning the leakage light other than the above one beam to the coated optical fiber from which the light has leaked. Accordingly, the present invention is able to provide, in the local-light coupling technique for improving the efficiency of work, the optical fiber local-light coupling apparatus configured to hardly affect the communication between the OLT and the ONU while causing the light to leak from the coated optical fiber in such an amount that makes it possible to confirm the communication state.

The reception leakage light passing through the leakage light passage portion is leakage light that forms the maximum peak in light intensity distribution of the leakage light in the longitudinal direction of the coated optical fiber. When the leakage light with the maximum peak in the light intensity distribution of the leakage light is received, sensitivity of the monitoring tool can be made higher than in the case of receiving the other leakage light. In other words, the communication state can be confirmed without reducing the bending radius, and thus the bending loss can be decreased.

For example, the reflective film is a metal film.

The optical fiber local-light coupling apparatus according to the present invention further includes a coating transparent with respect to the leakage light, the coating being configured to cover a surface of the reflective film on a side facing the convex portion of the second jig. When an operation to bend the coated optical fiber is carried out, large force is applied to the reflective film, which may cause the reflective film to be peeled off. As such, covering the surface of the reflective film with the coating can prevent the reflective film from being peeled.

The probe of the optical fiber local-light coupling apparatus according to the present invention is formed in a cylindrical shape an axis of which is oriented in a propagation direction of the reception leakage light, and an end portion of the probe for receiving the reception leakage light is formed in a tapered shape. Further, the probe of the optical fiber local-light coupling apparatus according to the present invention may be formed in a cylindrical shape an axis of which is oriented in the propagation direction of the reception leakage light, and the end portion of the probe for receiving the reception leakage light may be formed in a spherical shape. With the tapered or spherical shape, the cross-sectional area of the probe end portion on which the leakage light is incident can be increased, and light receiving efficiency of the leakage light may be improved.

The probe of the optical fiber local-light coupling apparatus according to the present invention is such that a surface of the probe is covered with a metal film. This makes it difficult for the leakage light incident on the probe to leak to the outside of the probe because the leakage light is reflected by the metal film. Thus, the attenuation of the leakage light can be reduced during the propagation thereof to the monitoring tool.

Effects of the Invention

The present invention is able to provide, in the local-light coupling technique for improving the efficiency of work, an optical fiber local-light coupling apparatus configured to hardly affect the communication between the OLT and the ONU while causing the light to leak from a coated optical fiber in such an amount that makes it possible to confirm the communication state.

BRIEF DESCRIPTION OF DRAWINGS

FIG. 5(a) illustrates a case in which an incident angle is smaller than a critical angle, while FIG. 5(b) illustrates a case in which the angle of incident light is larger than the critical angle.

DESCRIPTION OF EMBODIMENTS

Embodiments of the present invention will be described with reference to the accompanying drawings. The embodiments described below are examples of the present invention and the present invention is not limited to the embodiments described below. In the present specification and the drawings, constituent elements with the same reference signs indicate the same constituent elements.

Points of the Invention

Figure 1:
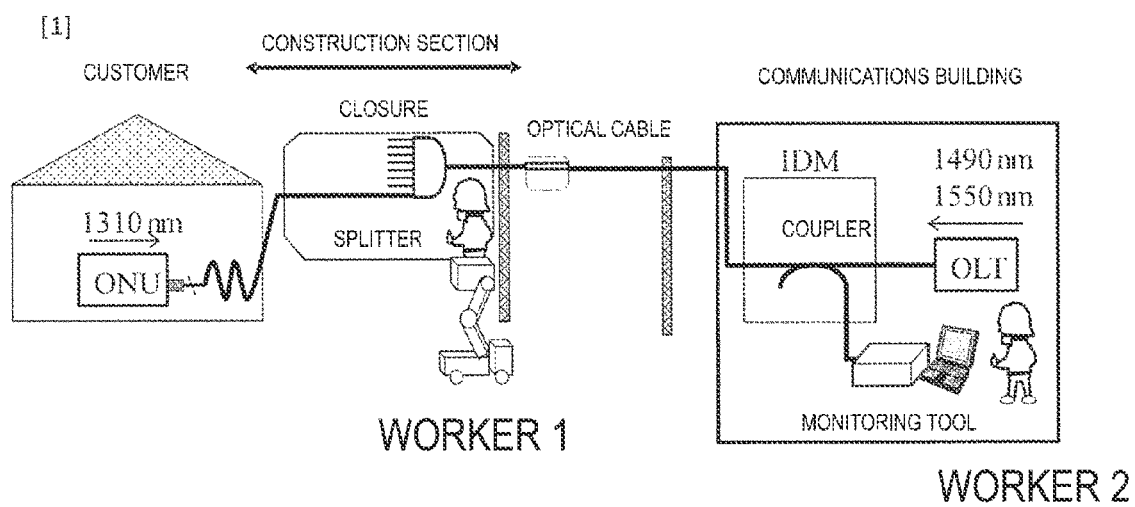
FIG. 1 is a diagram illustrating a form of an optical access network and an installation location of a monitoring tool.
Figures 2A, 2B:
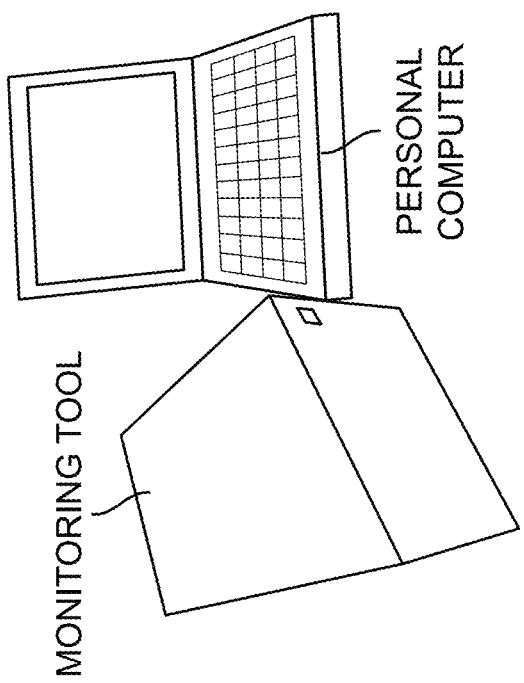
FIG. 2(a) is an external appearance of the monitoring tool.
FIG. 2(b) is an example of ONU information displayed on a personal computer.
Figure 3:
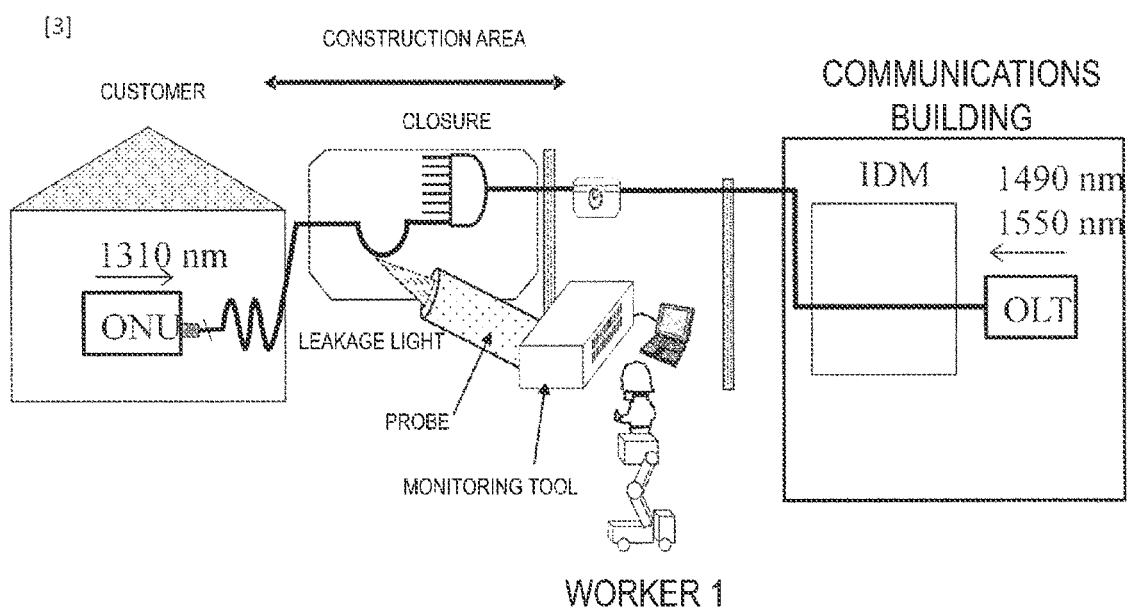
FIG. 3 is a diagram illustrating a confirmation operation of a communication state by utilizing a local-light coupling technique.
Figure 4:
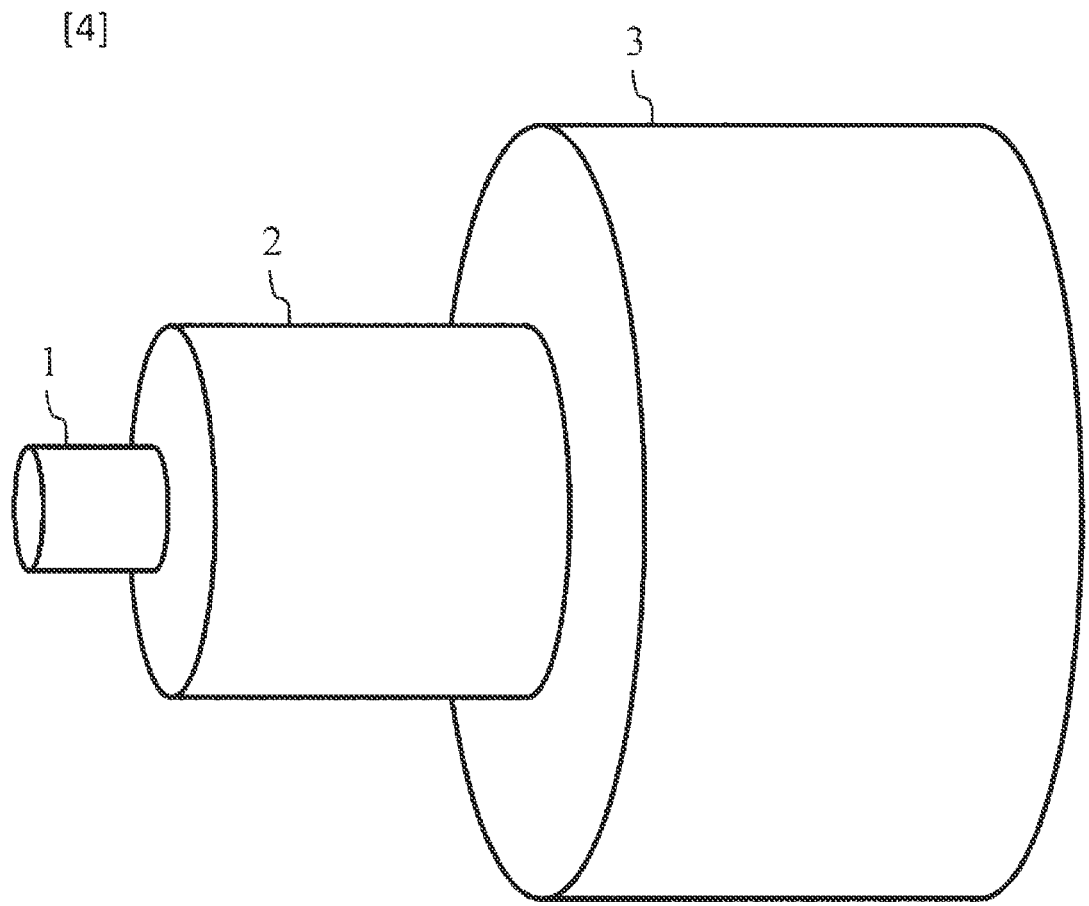
FIG. 4 is a diagram illustrating a coated optical fiber.

As illustrated in FIG. 4, a coated optical fiber has a three-layer structure including a glass section including a core glass 1 and a clad glass 2 covering the circumference of the core glass 1, and a coating 3 for protecting the glass section. The core glass 1 is mainly formed from pure quartz glass, and includes germanium dioxide as an additive. The refractive index is increased by adding germanium dioxide. On the other hand, the clad glass 2 is designed to have a lower refractive index than the core glass 1 by forming the clad glass 2 only from pure quartz glass.

The International Telecommunication Union Telecommunication Standardization Sector (ITU-T) defines the standard outer diameter of a quartz-based coated optical fiber used for communications to be 125 μm. When a refractive index of the core is taken as $n_1$ and a refractive index of the clad is taken as $n_2$, a relative refractive index difference $\Delta$ of the coated optical fiber is defined by the following equation.

[Math. 1]

$$\Delta = \frac{n_1^2 - n_2^2}{2n_1^2} \quad (1)$$

The types of coated optical fibers used for communications are classified according to the number of modes capable of propagation, and there are a single mode optical fiber and a multi-mode optical fiber. The single mode optical fiber is an optical fiber in which the number of propagation modes is one, and the multi-mode optical fiber is an optical fiber in which the number of propagation modes is equal to or larger than two. The core diameter of the single mode optical fiber is about 8 μm to 10 μm, and the core diameter of the multi-mode optical fiber is 50 μm or 62.5 μm.

Since the refractive indices differ between the core glass 1 and the clad glass 2, communication light is totally reflected at the interface thereof and propagates inside the core. In a multi-mode optical fiber, an angle of reflection at the interface between the core and the clad varies from mode to mode, and thus the light propagation distances of the respective modes varies. Accordingly, when an optical signal enters from an end surface of the multi-mode optical fiber, the propagation distance of each mode varies, so that the arrival time of the signal propagating inside the core is shifted. As a result, the signal waveform is distorted. Therefore, the multi-mode optical fiber is not applied to long-range communications, and is mainly utilized for near field communications. On the other hand, the single-mode fiber is applied to long-range communications. In optical access networks, the single mode fiber is applied.

Figure 5:
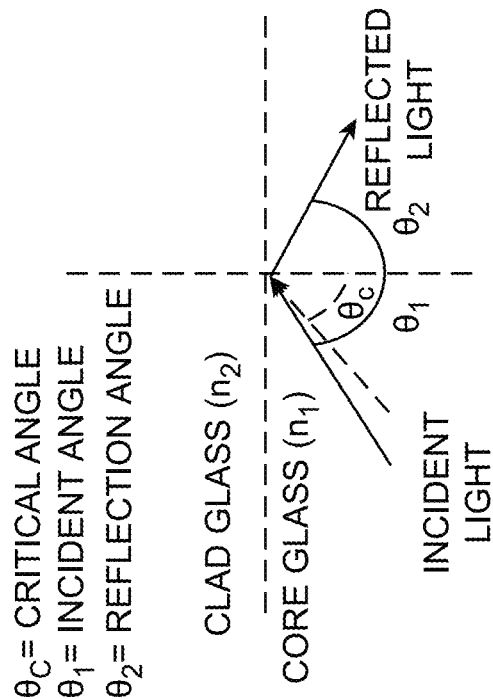
FIG. 5 is a diagram illustrating transmission and reflection of light when the light is incident on an interface of media having different refractive indices.
Figure 5:
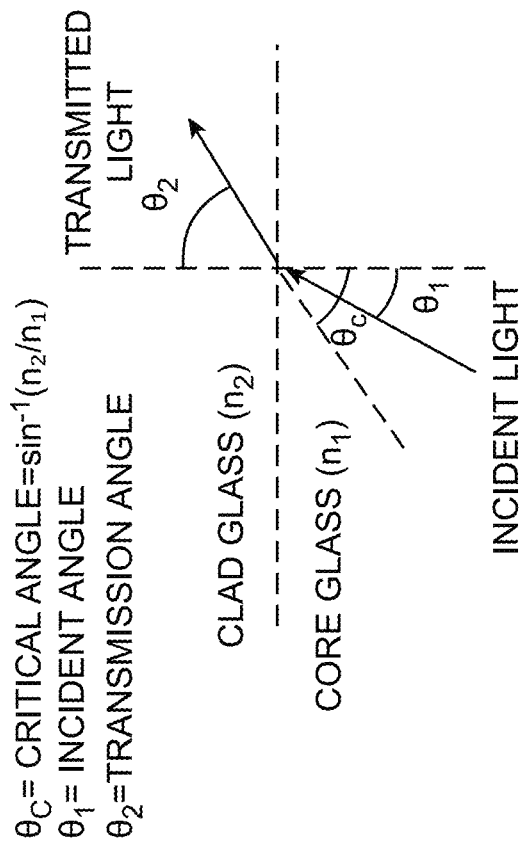

FIG. 5 illustrates the states of transmission and reflection of light when a coated optical fiber having a cylindrical shape is disposed on a straight line without being bent and the light is incident on the interface between the core and the clad having different refractive indices. FIG. 5(a) illustrates a case where an incident angle is smaller than a critical angle. When the incident light reaches the interface between the core and the clad, the incident light is transmitted to the inside of the clad glass. The angle of the transmitted light is obtained by Snell's law given below.

$$n_1 \cdot \sin \theta_1 = n_2 \cdot \sin \theta_2$$

Note that $\theta_1$ is an incident angle of a light beam, $\theta_2$ is a transmission angle, $n_1$ is a refractive index of the core glass, and $n_2$ is a refractive index of the clad glass.

FIG. 5(b) illustrates a case where an angle of incident light is larger than the critical angle. When the angle of the incident light exceeds the critical angle, the light beam is totally reflected at the interface between the core and the clad. This phenomenon causes the light to propagate inside the coated optical fiber. The critical angle is represented as follows from Snell's law.

$$\theta_c = \sin^{-1}(n_2/n_1)$$

In the case of $n_1 = 1.465$, and $n_2 = 1.462$, the critical angle $\theta_c$ is 86.3 degrees.

It is known that, when a coated optical fiber is bent, some of the light propagating inside the core leaks from the coated optical fiber. Then, leakage at a bend of a coated optical fiber is analyzed as follows by using Snell's law. As the conditions, the coated optical fiber includes a core glass and a clad glass, and the refractive index distribution thereof is assumed to be a step index type. The core diameter is 10 μm, the outer diameter of the clad glass is 125 μm, the refractive index of the core is 1.465, and the refractive index of the clad is 1.462. The bending radius of the coated optical fiber is 2 mm.

Figure 6:
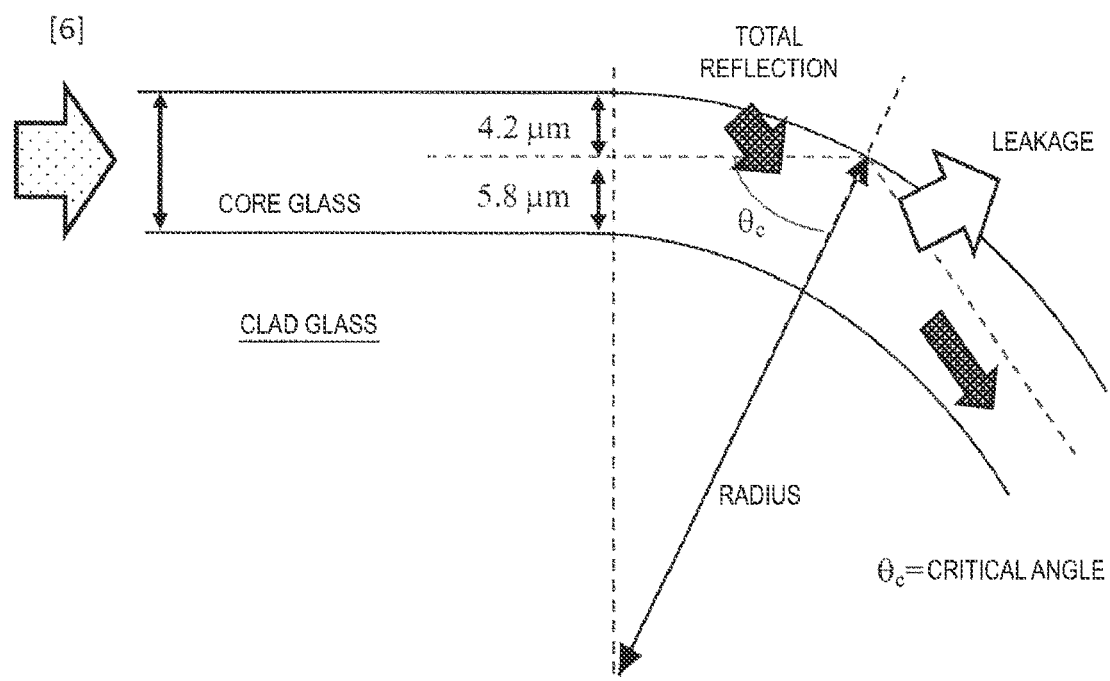
FIG. 6 is a diagram illustrating a model for analyzing leakage at a bend of a coated optical fiber.

A computational model is illustrated in FIG. 6. When a light beam enters from an end surface of the coated optical fiber, the light beam propagates linearly through the core to reach the interface between the core glass and the clad glass.

The reflection and the transmission are determined by the critical angle $\theta_c$, and the critical angle $\theta_c$ is 86.3 degrees. Light having an incident angle larger than the critical angle (black arrow) is totally reflected at the bend. The region of the total reflection was 4.2 μm with respect to the core diameter being 10 μm. On the other hand, light having an incident angle smaller than the critical angle (white arrow) is transmitted from the core glass to the clad. The region of the transmission was 5.8 μm with respect to the core diameter being 10 μm. In this manner, the total reflection and the leakage occur simultaneously at the bend of the coated optical fiber.

Figure 7:
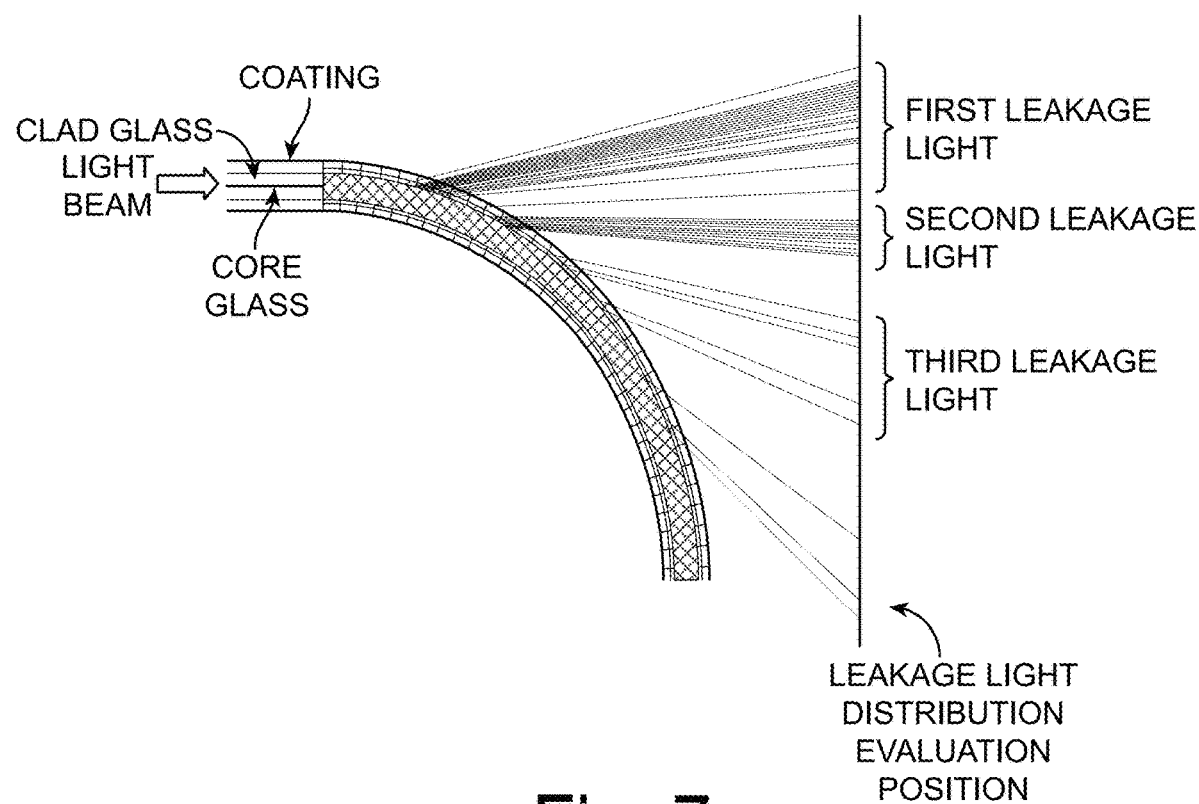
FIG. 7 is a diagram illustrating leakage light distribution at a bend of a coated optical fiber.
Figure 8:
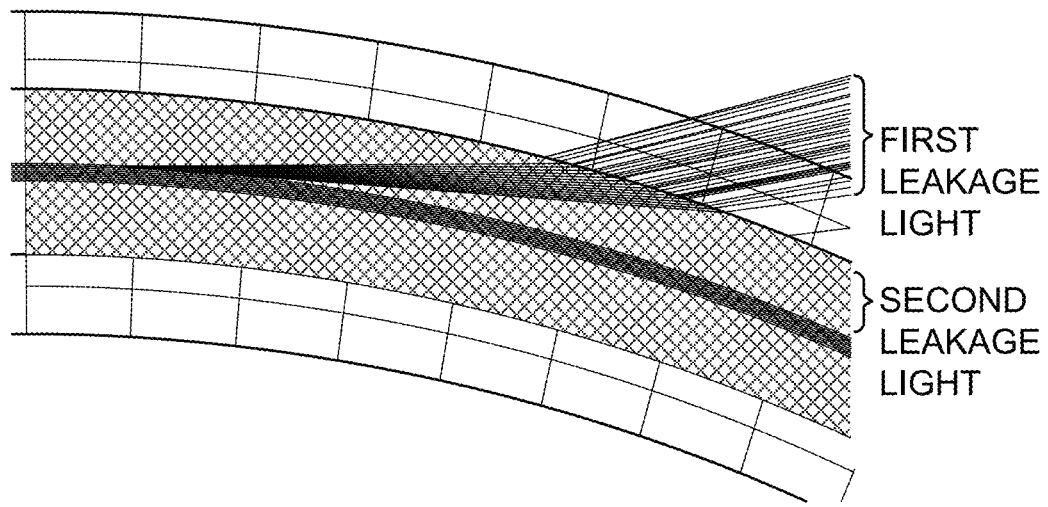
FIG. 8 is an enlarged diagram of leakage light at a bend of a coated optical fiber.

Ten thousand light beams regarded as light are inserted into the core glass of the coated optical fiber, and calculation results of the leakage from the bend of the coated optical fiber are indicated (ray tracing method). In the coated optical fiber model, the refractive index distribution of the core glass and the clad glass is assumed to be a step index type. The core diameter is 10 μm, the outer diameter of the clad glass is 125 μm, the refractive index of the core is 1.465, and the refractive index of the clad core is 1.462. Further, the outer diameter of a coating section covering a glass section is 250 μm, and the refractive index thereof is 1.586. The bending conditions of the coated optical fiber are such that the radius is 2 mm and the bending angle is 90 degrees. FIGS. 7 and 8 illustrate the calculation results about the reflection and the leakage at the interface between the core glass and the clad glass at the bend of the coated optical fiber when ten thousand light beams enter the core glass.

FIG. 7 illustrates light beam distribution when the coated optical fiber is bent with the radius being 2 mm and the bending angle being 90 degrees, and is a calculation result of the distribution of the leakage light from the bend of the coated optical fiber. FIG. 8 illustrates an enlarged diagram of a first leakage light distribution. FIG. 6 illustrates a calculation in the region where the light beam first reaches the clad glass and illustrates that the leakage and the total reflection occur simultaneously at the bend. The leakage illustrated in FIG. 6 corresponds to first leakage light illustrated in FIGS. 7 and 8.

A light beam that has not leaked at a point where the bend is present, that is, the light that has been totally reflected reaches the clad glass again at another point of the bend. At the point, some of the light leaks to the outside of the coated optical fiber. This leakage light is defined as second leakage light. A further calculation has shown that up to third leakage light is generated.

Figure 9:
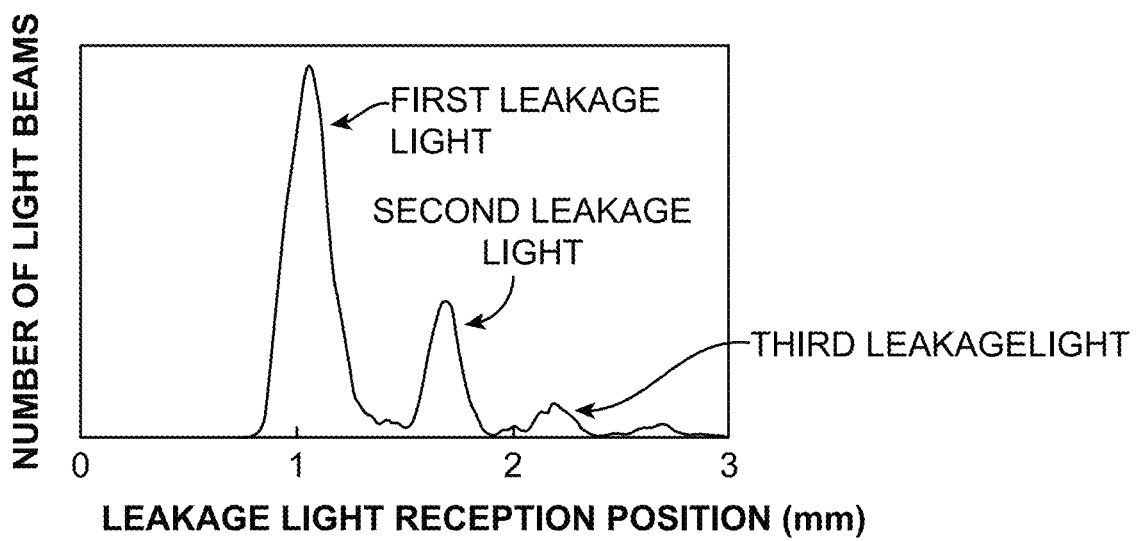
FIG. 9 is a diagram explaining leakage light distribution at a bend of a coated optical fiber.

The leakage light distribution is evaluated below. FIG. 9 shows a result of counting the number of light beams that reach a region separated from the bend as illustrated in FIG. 7. It is understood that the number of light beams is largest in the first leakage light, decreases in the second leakage light, and further decreases in the third leakage light. That is, it has been found that the leakage light is generated discretely at the bend of the coated optical fiber.

Figure 10:
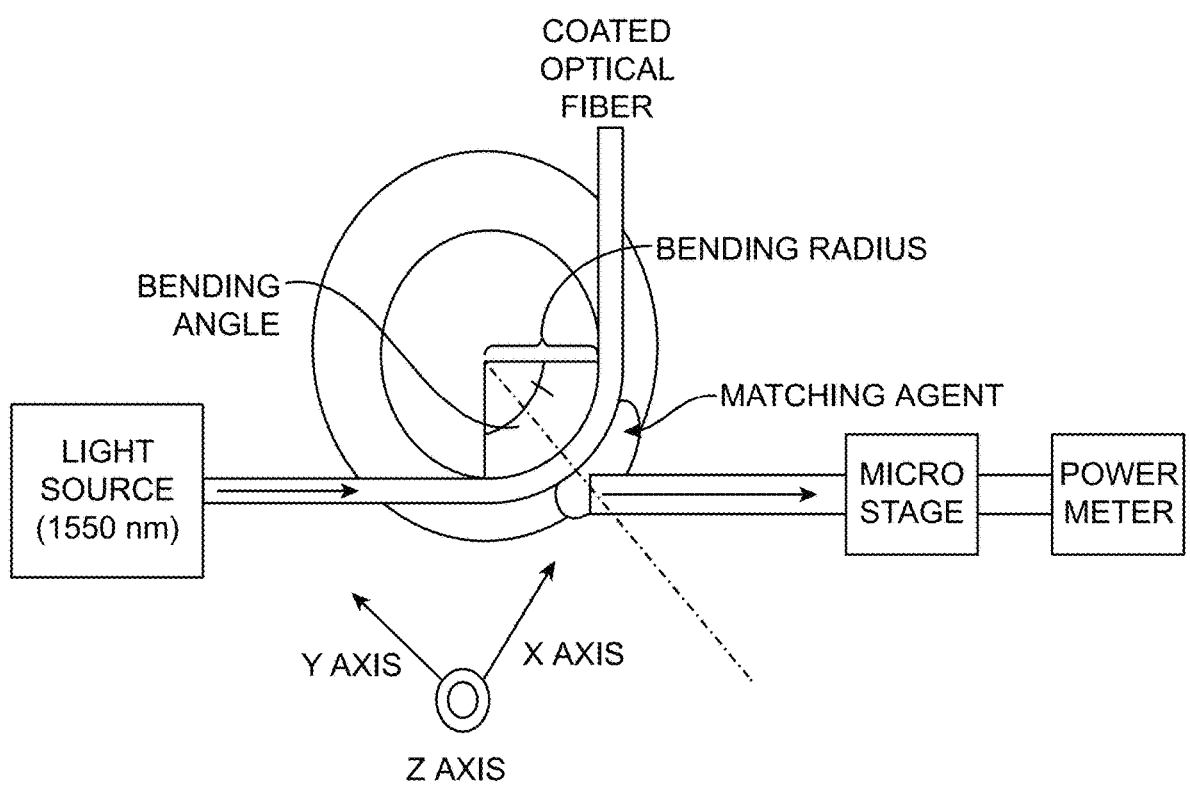
FIG. 10 is a diagram illustrating an apparatus configured to measure leakage light distribution at a bend of a coated optical fiber.

The analysis result using the ray tracing method is measured through distribution measurement of the leakage light. FIG. 10 is a diagram illustrating a measurement apparatus configured to measure the leakage light. The bending conditions of the coated optical fiber are such that the radius is 2 mm and the bending angle is 90 degrees, which are the same conditions as those of the analysis. The leakage light distribution is measured by disposing a probe near the bent fiber and moving the probe. A graded index fiber (GI fiber) with a core diameter of 50 μm is used as the probe. The probe is adjusted to be disposed at a position where the first leakage light is obtained at the highest level, and this position is used as a reference. Thereafter, the probe is moved.

Figure 11:
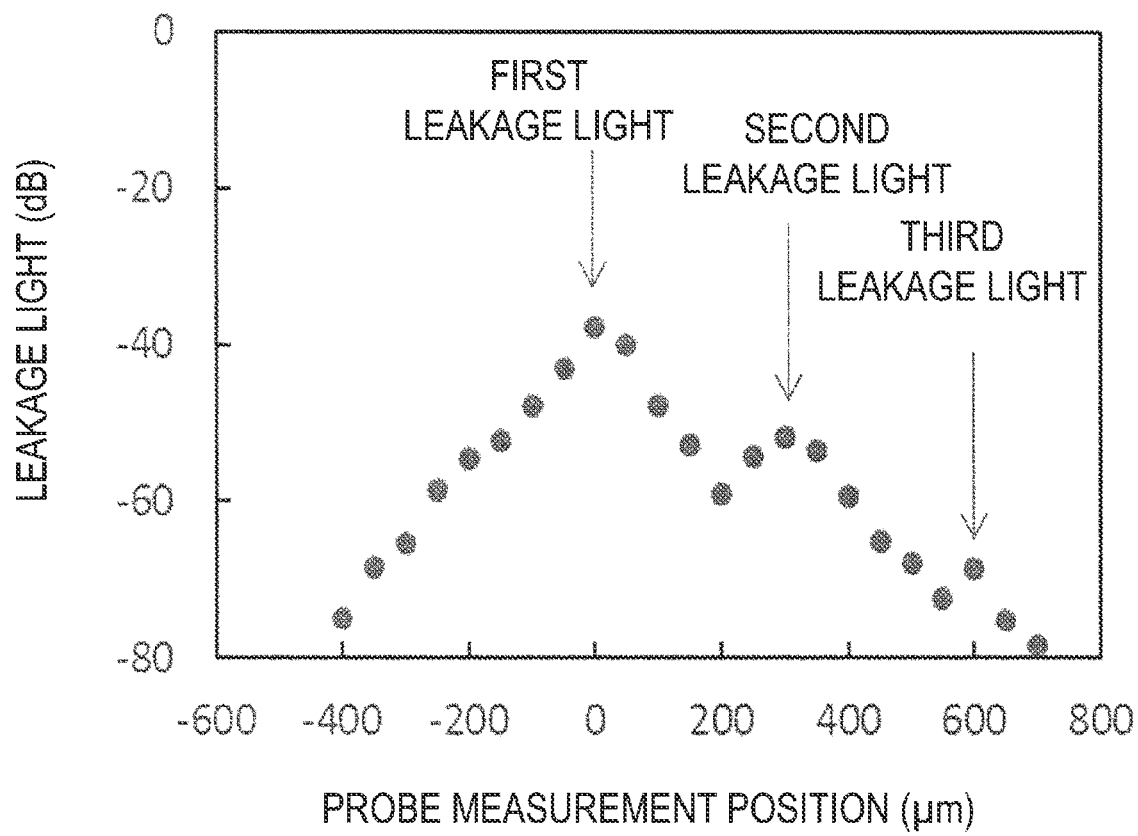
FIG. 11 is a diagram explaining a measurement result of leakage light distribution at a bend of a coated optical fiber.

FIG. 11 is a diagram explaining the distribution of the measured leakage light. There are three peaks in the distribution of the leakage light as in FIG. 11. These three peaks correspond to the first leakage light, the second leakage light, and the third leakage light. Note that the horizontal axis scales of FIG. 9 and FIG. 11 are different because of a difference in installation position of the probe. In the analysis of FIG. 9, the probe is disposed at a location remote from the bend, while in the measurement of FIG. 11, the probe is installed near the bend.

In the measurement result of FIG. 11, there are also three peaks of the leakage light. As mentioned above, the analysis result and the measurement result represent the same trend, and it can be understood that the leakage light is discretely generated from the one bend.

Figure 12:
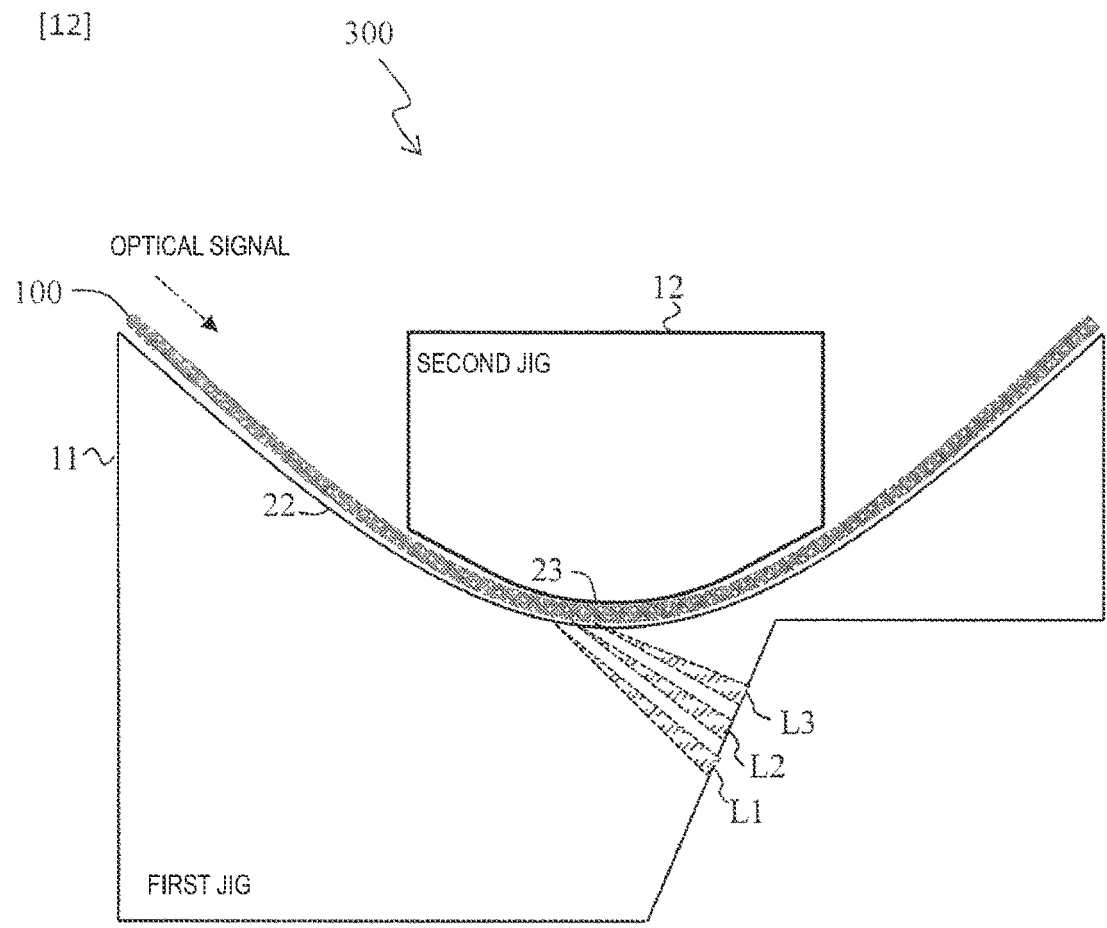
FIG. 12 is a diagram illustrating leakage light that leaks when a coated optical fiber is bent in an optical fiber local-light coupling apparatus.

FIG. 12 is a diagram illustrating an optical fiber local-light coupling apparatus 300 configured to bend a coated optical fiber so as to cause propagating light to leak. The optical fiber local-light coupling apparatus 300 includes: a first jig 11 including a concave portion 22 curved in a longitudinal direction with respect to a coated optical fiber 100; a second jig 12 including a convex portion 23 that is curved in the longitudinal direction with respect to the coated optical fiber 100 and sandwiches the coated optical fiber 100 between the convex portion 23 and the concave portion 22 of the first jig 11: and a pressing unit (not illustrated) configured to apply pressing force in a direction in which the concave portion 22 of the first jig 11 and the convex portion 23 of the second jig 12 approach each other to form a bend in the coated optical fiber 100.

The optical fiber local-light coupling apparatus 300 includes the first jig 11 of a concave type and the second jig 12 of a convex type. A bend is formed in the coated optical fiber 100 by sandwiching the coated optical fiber 100 between the concave portion 22 of the first jig 11 and the convex portion 23 of the second jig 12. Since the first jig 11 is formed from a transparent material such as plastic, a plurality of beams of leakage light L pass through the inside of the first jig 11 and are radiated to the outside when the coated optical fiber 100 is bent.

An OLT and an ONU communicate with each other via the coated optical fiber 100, and the coated optical fiber 100 is bent by the optical fiber local-light coupling apparatus 300, thereby causing part of uplink light (leakage light L1, L2, and L3) of the ONU to leak. Here, when the coated optical fiber 100 is bent as illustrated in FIG. 12, the amount of light is decreased because part of communication light in the coated optical fiber 100 leaks to the outside due to the bend. This decrease in light amount is called "bending loss". When the bending loss increases. communication light does not reach between the OLT and the ONU, so that the communication between the OLT and ONU is completely stopped. When the communication stops as mentioned above, the uplink light of the ONU cannot be acquired. To prevent this, the bending loss of the coated optical fiber is required to be small.

Figure 13:
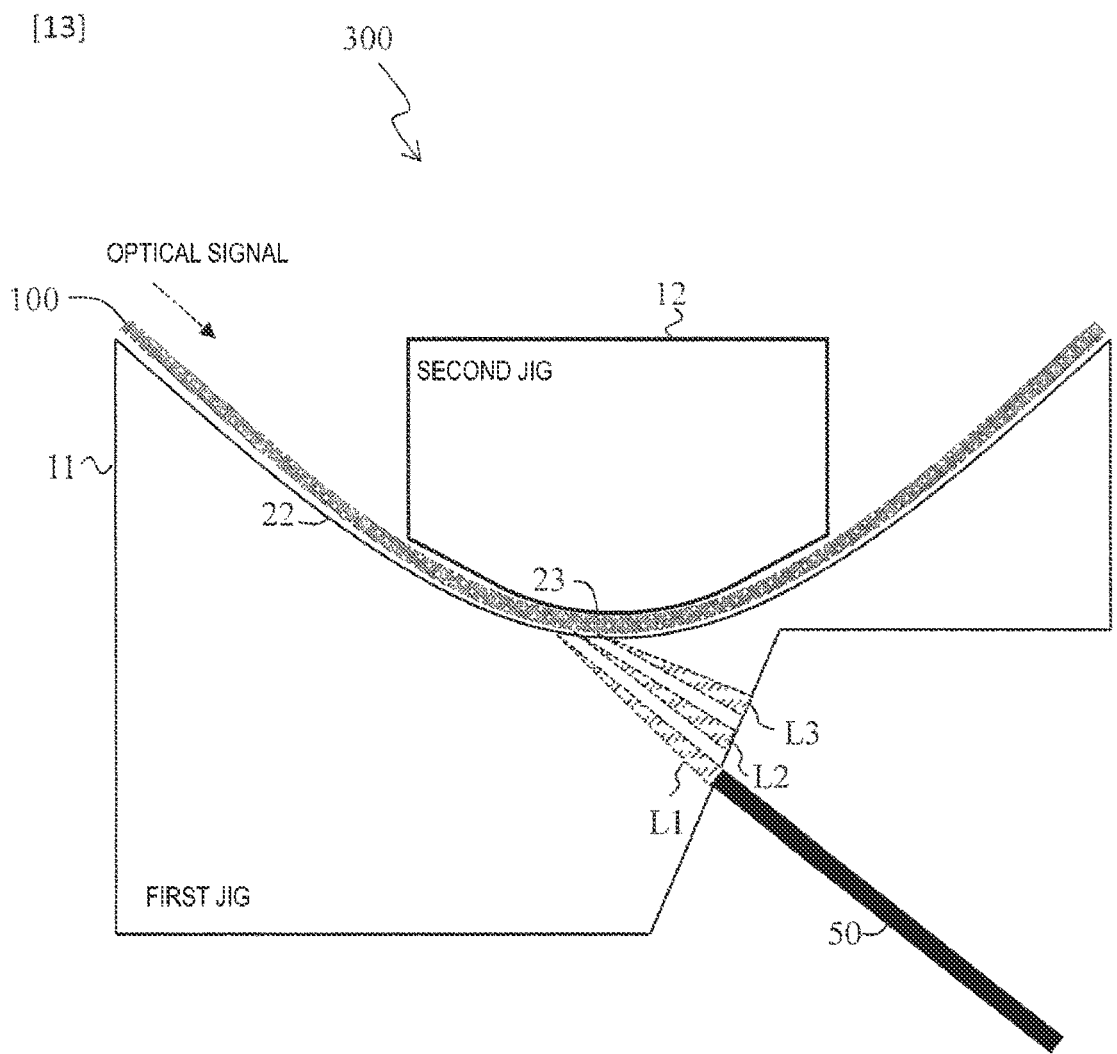
FIG. 13 is a diagram illustrating leakage light that leaks when a coated optical fiber is bent in an optical fiber local-light coupling apparatus.

The first jig 11 includes a probe 50 configured to receive leakage light leaking from the coated optical fiber 100 being bent. FIG. 13 is a diagram in which one end of the probe 50 is fixed to the first jig 11 of the optical fiber local-light coupling apparatus 300. The optical fiber local-light coupling apparatus 300 is able to extract the leakage light by using the probe 50 and thus has a function of an optical branching device. The diameter of the probe 50 is limited in size.

An avalanche photodiode (abbreviated as APD) needs to be disposed at the other end of the probe 50 to convert the optical signal to an electrical signal. The diameter size of the APD is approximately 100 µm. Accordingly, the diameter of the probe 50 is also limited. The probe 50, the diameter of which is limited by the APD, cannot receive all of the leakage light (L1 to L3) generated at the bend. Because of this, it is most efficient in light reception to receive part of the first leakage light L1 having the strongest intensity with the probe 50.

Figure 14:
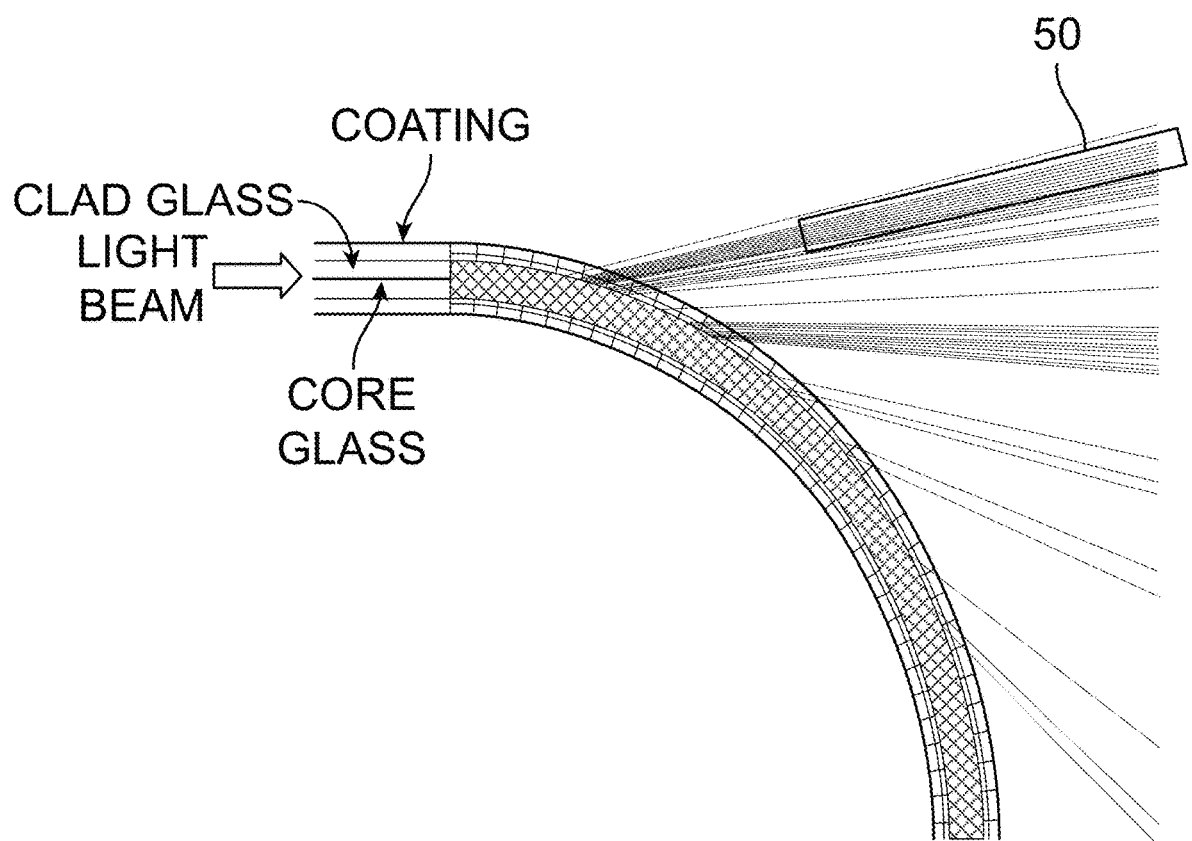
FIG. 14 is a conceptual diagram in which a probe receives leakage light that leaks when a coated optical fiber is bent in an optical fiber local-light coupling apparatus.

As illustrated in FIG. 14, the leakage light leaks radially, and thus even when the probe 50 formed in a cylindrical shape is disposed, a large part of the leakage light does not enter the probe 50, but passes through the outside of the probe. Since the amount of the leakage light is small, it is necessary to cause as much the leakage light as possible to enter the probe 50 in order to improve the light receiving efficiency.

First Embodiment

Figure 16:
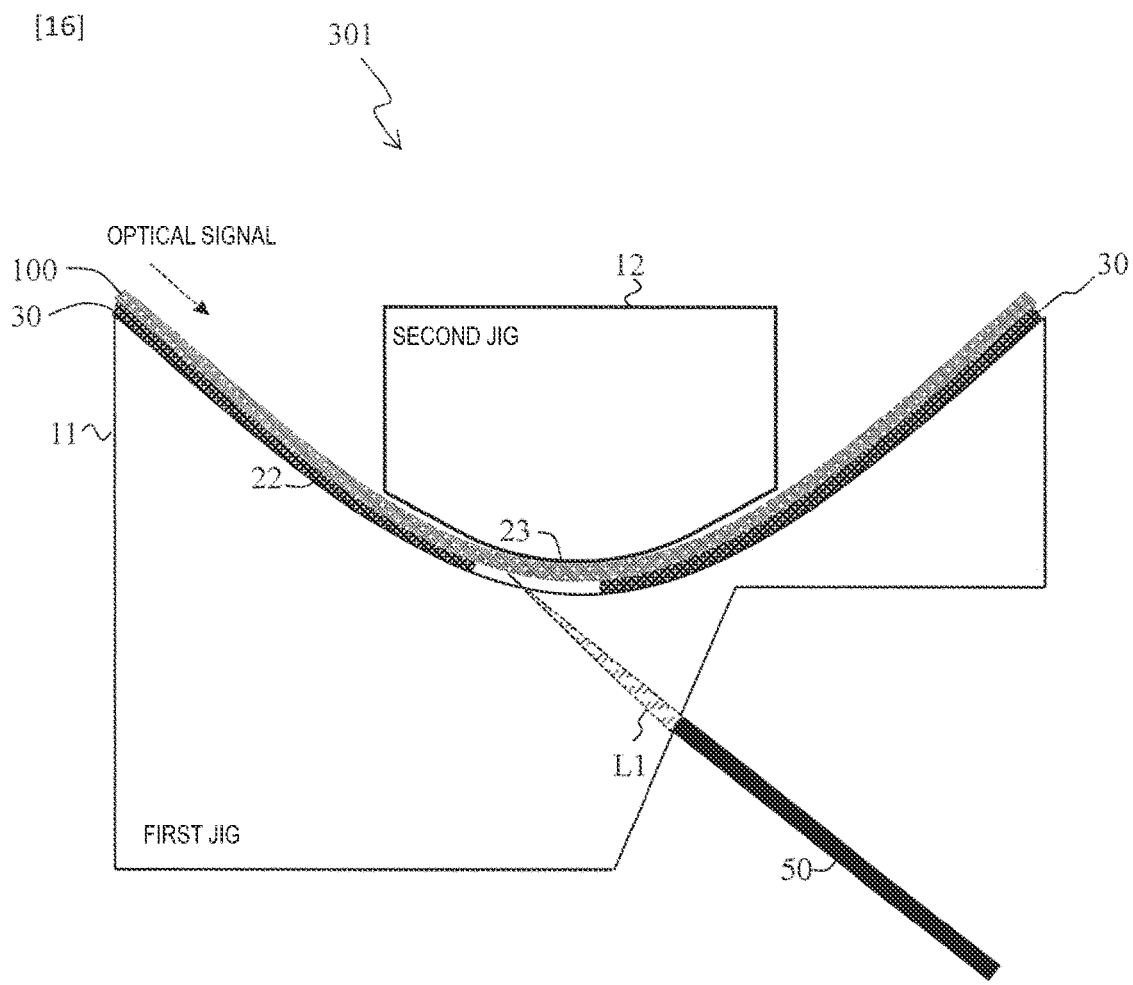
FIG. 16 is a conceptual diagram illustrating the optical fiber local-light coupling apparatus according to the present invention.

FIG. 16 is a diagram illustrating an optical fiber local-light coupling apparatus 301 according to the present embodiment. The optical fiber local-light coupling apparatus 301 further includes, in addition to those included in the optical fiber local-light coupling apparatus 300 in FIG. 13, a reflective film 30 configured to cover a surface of the concave portion 22 of the first jig 11 except for a leakage light passage portion 26. Among leakage light L, reception leakage light to be received by the probe 50 passes through the leakage light passage portion 26. The reflective film 30 reflects and returns leakage light other than the reception leakage light to the coated optical fiber 100.

Figure 15:
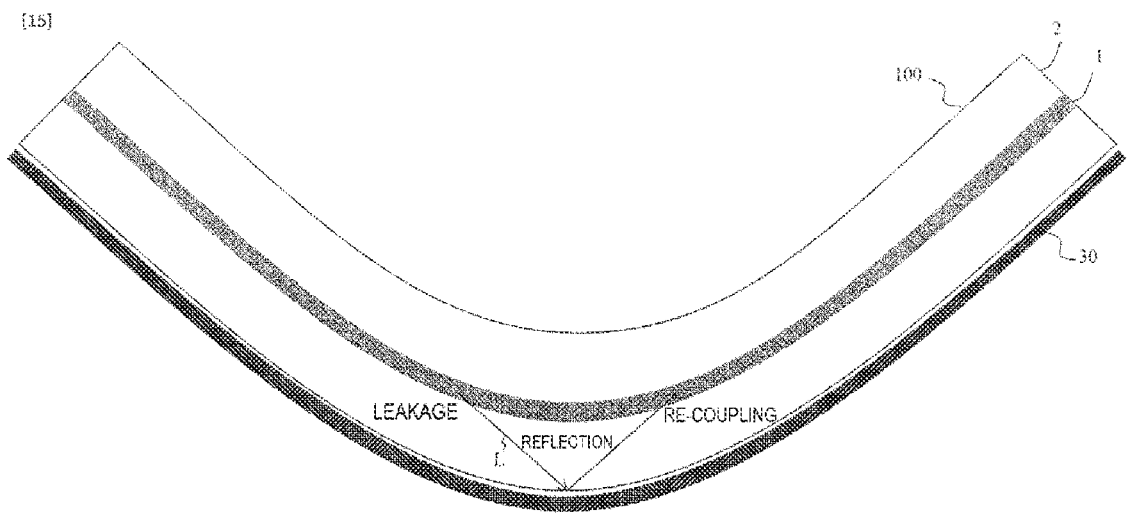
FIG. 15 is a conceptual diagram illustrating operations of an optical fiber local-light coupling apparatus according to the present invention.

As described above, when the coated optical fiber is bent, a plurality of beams of the leakage light L are generated. Then, in the case where the leakage light L having leaked from the core glass 1 of the coated optical fiber 100 can be returned to the original core glass 1, it is possible to reduce bending loss. FIG. 15 is a diagram illustrating a structure in which the leakage light L returns to the core glass 1. The optical fiber local-light coupling apparatus 301 includes, on the concave portion 22 of the first jig 11 (a surface in contact with the coated optical fiber 100), a metal film made from gold, silver, aluminum, nickel, chrome, or the like and configured to reflect the leakage light L, as the reflective film 30. The reflective film 30 reflects the leakage light L, and couples the reflected light again to the core glass 1 of the coated optical fiber 100. Since the leakage light L returns to the coated optical fiber, it is possible to reduce the bending loss.

Here, in a case where the reflective film 30 is provided on the whole concave portion 22, the communication light cannot be branched toward the probe 50. Accordingly, the reflective film 30 is provided with the portion (leakage light passage portion) 26, through which the leakage light passes. The leakage light passage portion 26 can be formed by simply removing a portion of the reflective film corresponding to the leakage light passage portion 26. The leakage light passage portion 26 is formed in a portion through which the leakage light L (first leakage light) that forms the maximum peak in the light intensity distribution of the leakage light L in the longitudinal direction of the coated optical fiber 100.

Second Embodiment

Figure 17:
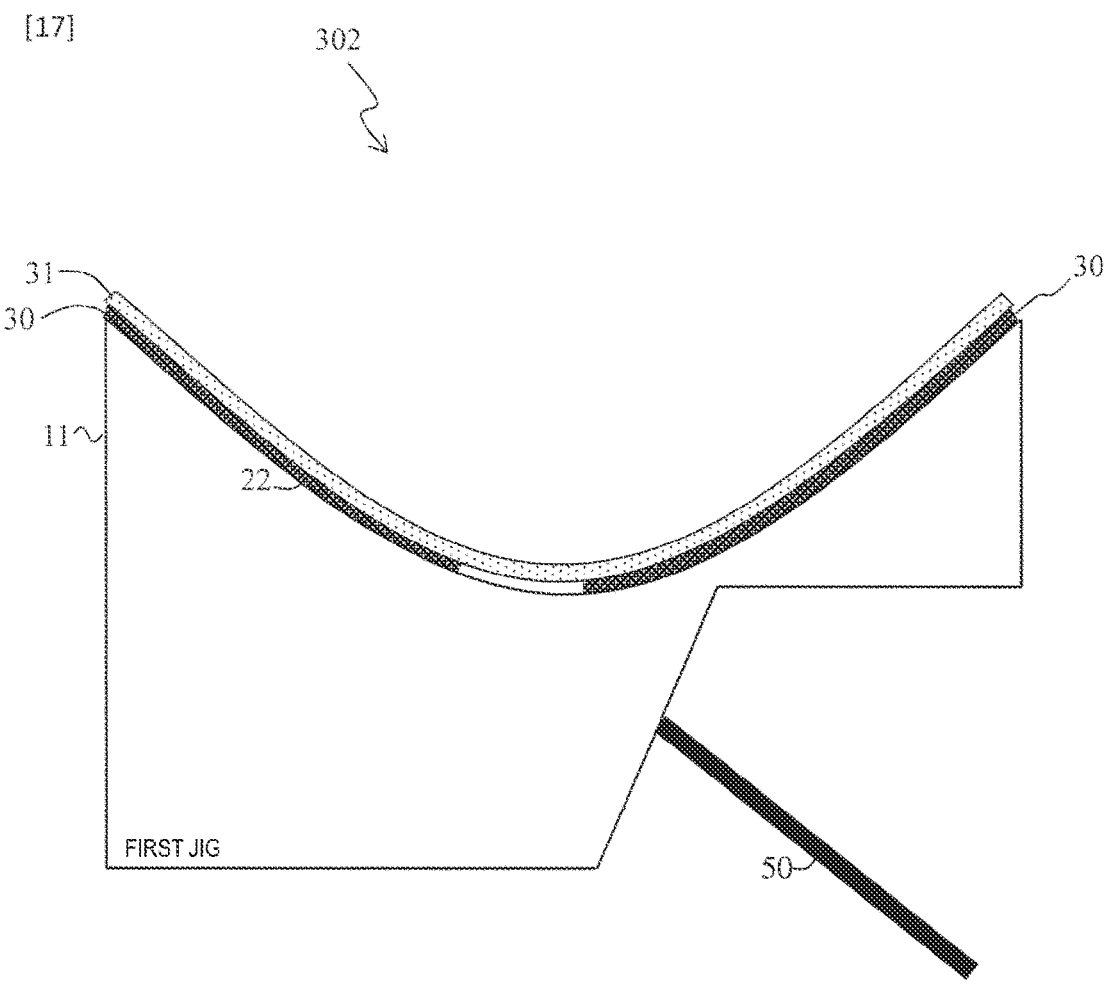
FIG. 17 is a conceptual diagram illustrating the optical fiber local-light coupling apparatus according to the present invention.

FIG. 17 is a diagram illustrating an optical fiber local-light coupling apparatus 302 according to the present embodiment. The optical fiber local-light coupling apparatus 302 further includes, in addition to those of the optical fiber local-light coupling apparatus 301 in FIG. 16, a coating 31 transparent with respect to leakage light L and configured to cover a surface of the reflective film 30 on a side facing the convex portion 23 of the second jig 12. The description of the second jig 12 is omitted in FIG. 17.

It is assumed that portion of the reflective film 30 is peeled when the coated optical fiber 100 is repeatedly sandwiched in the optical fiber local-light coupling apparatus 301. When the reflective film 30 is peeled, bending loss increases. That is, when the reflective film 30 is rubbed against the coated optical fiber 10 and thus worn, the function of returning the leakage light to the coated optical fiber 100 is impaired, which makes communication between the OLT and the ONU difficult.

Thus, as illustrated in FIG. 17, the transparent coating 31 is further provided on the surface of the reflective film 30. The coating 31 is formed from, for example, quartz glass, plastic, or acrylic resin. The coating 31 prevents the reflective film 30 from being worn.

Third Embodiment

Figure 18:
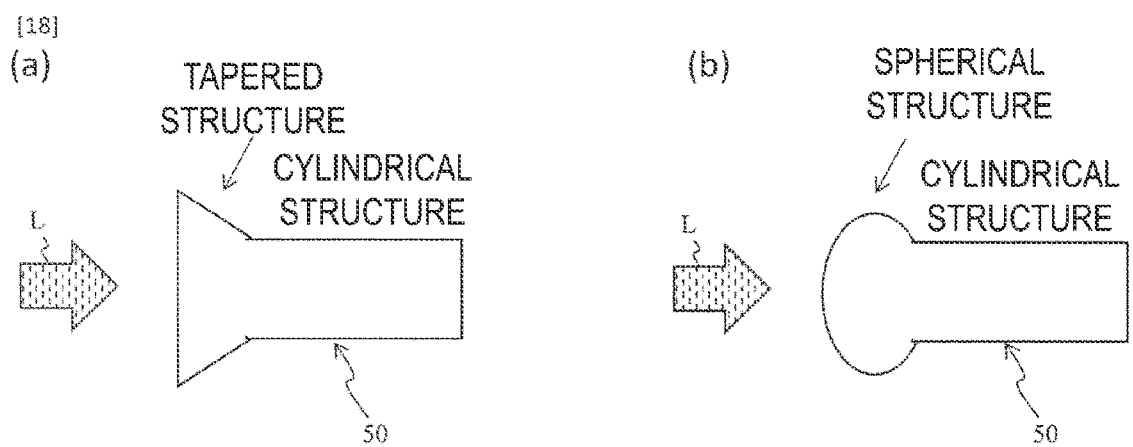
FIG. 18 is a conceptual diagram illustrating a probe of the optical fiber local-light coupling apparatus according to the present invention.

FIG. 18 is a diagram illustrating a structure of a probe of an optical fiber local-light coupling apparatus according to the present embodiment. The probe 50 of each of the optical fiber local-light coupling apparatuses 301 and 302 mentioned above is formed in a cylindrical shape the axis of which is oriented in a propagation direction of the leakage light L to be received. An end portion thereof for receiving the leakage light L to be received is formed in a tapered or spherical shape.

In general, the probe 50 has a cylindrical shape of the coated optical fiber. However, since the leakage light L spreads on the taper, the improvement in light receiving efficiency is limited when the probe 50 has a cylindrical shape. Then, in order to receive more of the leakage light L, the tip portion of the probe 50 is changed from a shape obtained by cutting a cylinder to a tapered shape (FIG. 18(a)) or to a spherical shape (FIG. 18(b)). Since a cross-sectional area of the end portion of the probe 50 increases, more of the leakage light L may be received. Accordingly, by making the tip portion of the probe 50 have the shapes as illustrated in FIG. 18, the light receiving efficiency can be improved.

Fourth Embodiment

Figure 19:
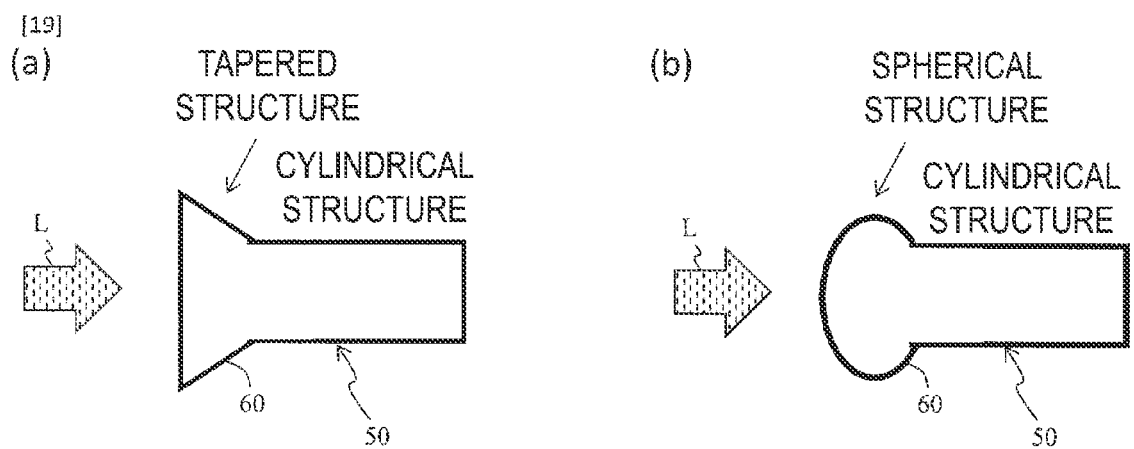
FIG. 19 is a conceptual diagram illustrating the probe of the optical fiber local-light coupling apparatus according to the present invention.

In the present embodiment, a structure for further improving light receiving efficiency of the optical fiber local-light coupling apparatus described in the third embodiment will be explained. FIG. 19 is a diagram illustrating a structure of a probe of an optical fiber local-light coupling apparatus of the present embodiment. The probe 50 of each of the optical fiber local-light coupling apparatuses 301 and 302 mentioned above has a surface covered with a metal film 60.

The probe 50 of the present embodiment is such that the surface of the probe 50 described in FIG. 18 is covered with the metal film 60. FIG. 19(a) illustrates the probe 50 with the tip thereof formed in a tapered shape, and FIG. 19(b) illustrates the probe 50 with the tip thereof formed in a spherical shape. The metal film exhibits a reflective effect, and light that has entered into the probe propagates through the inside of the probe covered with the metal film. Due to this, the light will not leak to the outside of the probe once introduced into the probe. Accordingly, the light receiving efficiency may be further improved by covering the probe 50 with the metal film 60. For the metal film 60, a material having a high reflection factor, such as gold, silver, aluminum, nickel, chrome, or the like is used.

REFERENCE SIGNS LIST

11 First jig
12 Second jig
22 Concave portion
23 Convex portion
30 Reflective film
31 Coating
50 Probe
60 Metal film
100 Coated optical fiber
300-302 Optical fiber local-light coupling apparatus

The invention claimed is:

1. An optical fiber local-light coupling apparatus comprising:
   a first jig including a concave portion curved in a longitudinal direction with respect to a coated optical fiber, and a probe configured to receive leakage light leaking from the coated optical fiber being bent;
   a second jig including a convex portion curved in the longitudinal direction with respect to the coated optical fiber, the convex portion being configured to sandwich the coated optical fiber between the convex portion and the concave portion of the first jig;
   a pressing unit configured to apply pressing force in a direction in which the concave portion of the first jig and the convex portion of the second jig approach each other to form a bend in the coated optical fiber, wherein the bend has a shape that causes a light intensity distribution of the leakage light to form a plurality of intensity peaks including a maximum intensity peak; and
   a reflective film that covers a surface of the concave portion of the first jig, wherein a removed portion of the reflective film enables the maximum intensity peak of the leakage light to pass through the removed portion of the reflective film to be received by the probe, and the reflective film reflects and returns the intensity peaks other than the maximum intensity peak of the leakage light to the coated optical fiber.

2. The optical fiber local-light coupling apparatus according to claim 1,
   wherein the reflective film is a metal film.

3. The optical fiber local-light coupling apparatus according to claim 1, further comprising:
   a coating transparent with respect to the leakage light, the coating being configured to cover a surface of the reflective film on a side facing the convex portion of the second jig.

4. The optical fiber local-light coupling apparatus according to claim 1,
   wherein the probe is formed in a cylindrical shape, wherein an axis of the probe is oriented in a propagation direction of the received leakage light, and an end portion of the probe for receiving the received leakage light is formed in a tapered shape.

5. The optical fiber local-light coupling apparatus according to claim 1,
   wherein the probe is formed in a cylindrical shape, wherein an axis of the probe is oriented in a propagation direction of the received leakage light, and an end portion of the probe for receiving the received leakage light is formed in a spherical shape.

6. The optical fiber local-light coupling apparatus according to claim 2,
   wherein a surface of the probe is covered with a metal film.

* * * * *